Patented Apr. 13, 1937

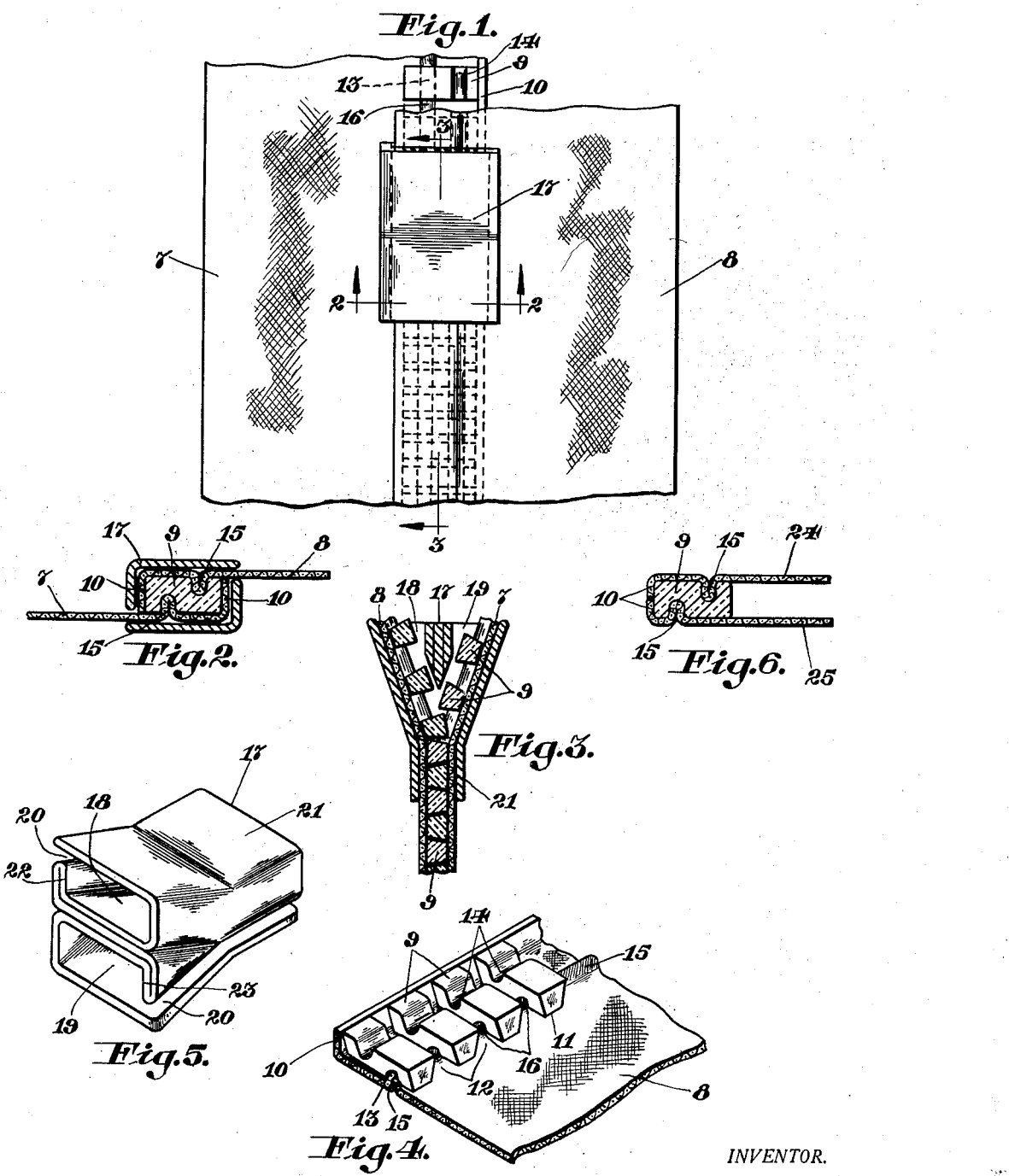
April 13, 1937. G. SUNDBACK 2,077,350
MULTIPLE INTERLOCKING FASTENER
Filed Dec. 7, 1935
INVENTOR.
Gideon Sundback.
BY Kelley & Chisholm
ATTORNEYS.

2,077,350

UNITED STATES PATENT OFFICE 2,077,350

MULTIPLE INTERLOCKING FASTENER

Gideon Sundback, Meadville, Pa., assignor to Hookless Fastener Company, Meadville, Pa., a corporation of Pennsylvania Application December 7, 1935, Serial No. 53,352

8 Claims. (Cl. 24—205)

My invention relates to fasteners with multiple interlocking elements and more particularly to that class of fasteners having interengaging series of rigid fastener elements attached in uniformly spaced relation to flexible stringers.

Preferably also, a slider is provided for engaging and disengaging the fastener elements.

An object of the invention is to provide such a fastener with multiple interlocking elements of a very simple construction which readily lends itself to easy manufacture from either metal or from non-metallic materials, such as pyroxylin.

A further object of the invention is to provide a fastener of the above type wherein the interlock between the sides of the fastener utilizes portions of flexible material between the elements.

Still another object is to provide a fastener in which the fastener elements are securely anchored to the tapes so that it is extremely difficult to dislocate even a single element on the tape.

Many other objects and advantages of my invention will more fully appear upon reading the following description of a specific embodiment of the invention.

In the illustrated embodiment shown in the drawing,

Fig. 1 represents a plan view of a fastener made according to my invention;

Fig. 2 is a cross-sectional view on line 2—2 of Fig. 1;

Fig. 3 is a detail longitudinal section on line 3—3 of Fig. 1;

Fig. 4 is a detail perspective view of one side of the fastener;

Fig. 5 is a perspective view of the slider; and

Fig. 6 is a cross-section showing my modified form of fastener.

The general structure of the fastener illustrated resembles in many respects the present day commercial slide fastener in that it has a pair of flexible tapes 7, 8 with cooperating series of rigid fastener elements 9 attached to the adjacent edges of the tapes. The tapes 7 and 8 are employed to attach the fastener in the article to be closed, by suitable means, such as stitching, riveting, cementing or the like. As distinguished from the conventional type of slide fastener, the fastener elements 9 are preferably arranged between overlapping portions of the tapes and elements, as indicated at 10 in Fig. 4. This provides a structure in which the rigid fastener elements are totally covered up by the material of the tape stringers.

Referring to Figs. 3 and 4 each of the fastener elements consists of an elongated block of generally trapezoidal cross-section with the parallel sides of the block in contact with the tape stringers. The alternate blocks are attached to one tape while the intermediate blocks are attached to the opposite tape. The attachment is along the narrower sides 11 of the trapezoidal blocks so that when one side of the fastener is separated from the other side there will be recesses 12 between the fastener elements of the same cross-section as the blocks. The fastener elements on one tape will thus dovetail in between the fastener elements on the opposite tape, which secures them together against separation transversely of the plane of the tapes but does not resist lateral force applied to the tapes, such as when the opposite sides of the fastener are placed under tension.

It will be noted that each of the fastener elements has on its narrow side a recess 13 and on its wider side a recess 14 of substantially the same depth. Preferably the recess 14 is placed closer to the edge of the tape than the recess 13. In order to provide means between the elements to interlock with the recess 14 of the opposite row of elements a flexible bead may be provided on the fabric. While such a bead might be made by attaching a cord to the face of the fabric I preferably form the material of the tape with a fold or crease 15 which extends into the recesses 13 and which provides between the fastener elements, the ribs or projections 16. These ribs 16 fit into the recesses 14 of the fastener elements on the opposite tape. This provides in effect a very secure interlock between the opposite sides of the fastener to resist all lateral forces. Such lateral force is also resisted to some extent by the overhanging edge portions 10 of the tapes.

The opposite series of fastener elements may be progressively engaged and disengaged by hand but preferably I employ a slider generally designated 17. This slider may be made by bending up a sheet metal blank into the form shown in Fig. 5. The slider embodies at its entrance end two channels 18, 19 which totally surround the opposite rows of fastener elements on four sides except for a slot 20 through which the tapes 7 or 8 project. The channels 18 and 19 converge at the middle of the slider into a single channel 21 and as the fastener elements pass into the single channel they enter between one another in the manner illustrated in Fig. 3. At the point of convergence of the channel the stringers are so flexed that the space between the fastener elements widens and allows them to enter into mutual engagement. The walls 22, 23 of the diverging channels 18 and 19 will guide the opposed rows of elements into lateral alignment so that the grooves 14 in the fastener elements will pass over and interlock with the ribs 16.

The only difference between the fastener shown in Fig. 6 and that shown in Fig. 2 is that the tapes 24, 25 extend in the same direction which makes a desirable form of fastener for pouches and hand bags. In this form of fastener the elements 9 on one stringer must be arranged in opposite end to end relation (with respect to the edge of the tape) from the elements on the mating stringer.

As a result of my invention it will be apparent that a novel form of fastener with multiple interlocking elements has been provided wherein the elements are of very simple construction and may be readily attached to the tape. If the fastener elements are made from celluloid which is the preferred material, the attachment of the elements may be accomplished by sticking the material of the elements to the contacting surfaces of the fabric tapes. Such sticking may be accomplished by any suitable cement or by the application of solvent to elements of pyroxylin material in such amounts as to soften the surfaces sufficiently to cause them to adhere to the tape either with or without the application of pressure. If the elements are made of metal, the recesses 13 may be formed wide and then the element bent to clamp the folded portion 15 of the fabric tape. In any case it will be evident that each fastener element is more securely held to its tape by reason of the engagement of the fold 15 with the recess 13. Many advantages of my improved fastener will be apparent from the above description of the specific embodiments illustrated in the drawing and it is believed that the fastener will be found useful on many articles such as pouches, bags and other fastener applications where extreme flexibility is not a requisite.

While I have shown and described two embodiments which my invention may assume in practice these embodiments are merely for the purposes of illustration and description and various other forms may be devised within the scope of my invention as set forth in the appended claims.

What I claim as my invention is:

1. A fastener of the class described comprising a pair of flexible tapes and fastener elements of rigid material secured to each of said tapes in uniformly spaced relation, the fastener elements on one tape being adapted to enter between the fastener elements on the opposite tape, and flexible means between the elements of one tape adapted to interlock with the rigid elements on the opposite tape to resist a lateral pull on the fastener.

2. A fastener of the class described comprising a pair of flexible tapes and fastener elements of rigid material secured to each of said tapes in uniformly spaced relation, the fastener elements on one tape being adapted to enter between the fastener elements on the opposite tape, and means made of flexible material forming a projection in each of the spaces between the fastener elements on one tape, each of the elements on the opposite tape having a recess adapted to interlock with such projection.

3. A fastener of the class described comprising a pair of flexible tapes and fastener elements of rigid material secured to each of said tapes in uniformly spaced relation, the fastener elements on one tape being adapted to enter between the fastener elements on the opposite tape, and means consisting of flexible material providing a flexible rib extending between the elements on one tape, and each of the elements on the opposite tape having a groove adapted to fit over and interlock with said rib.

4. A fastener of the class described comprising a pair of flexible tapes and fastener elements of rigid material secured to each of said tapes in uniformly spaced relation, the fastener elements on one tape being adapted to enter between the fastener elements on the opposite tape, and means consisting of flexible material forming a projection extending across the space between each pair of fastener elements of each of the rows, and each of the elements having a groove extending across the same adapted to receive one of the flexible projections between the elements of the opposite row whereby lateral pull on the fastener is resisted.

5. A fastener of the class described comprising a pair of flexible tapes and fastener elements of rigid material secured to each of said tapes in uniformly spaced relation, the fastener elements on one tape being adapted to enter between the fastener elements on the opposite tape, each of said tapes having a fold which extends across the spaces between the elements and each of the elements having a groove adapted to receive and interlock with the fold on the opposite tape.

6. A fastener of the class described comprising a pair of flexible tapes with overlapping edges and a continuous series of blocks of trapezoidal shaped cross-section arranged between said overlapping portions with the parallel sides of said blocks positioned against the parallel opposed faces of said overlapping portions, the alternate blocks of the series each having their narrower side contacting one tape attached to said tape while the remaining blocks having their narrower sides contacting the opposite tape attached to said opposite tape, whereby said blocks will dovetail into one another and interlock against transverse separation.

7. A fastener of the class described comprising a pair of flexible tapes with overlapping edges and a continuous series of blocks of trapezoidal shaped cross-section arranged between said overlapping portions with the parallel sides of said blocks positioned against the parallel opposed faces of said overlapping portions, the alternate blocks of the series each having their narrower side contacting one tape attached to said tape, while the remaining blocks having their narrower sides contacting the opposite tape attached to said opposite tape whereby said blocks will dovetail into one another and interlock against transverse separation, and means to resist lateral separation of said blocks.

8. A fastener of the class described comprising a pair of flexible tapes with overlapping edges and a continuous series of blocks of trapezoidal shaped cross-section arranged between said overlapping portions with the parallel sides of said blocks positioned against the parallel opposed faces of said overlapping portions, the alternate blocks of the series each having their narrower side contacting one tape attached to said tape, while the remaining blocks having their narrower sides contacting the opposite tape attached to said opposite tape whereby said blocks will dovetail into one another and interlock against transverse separation, and means to resist lateral separation of said blocks, including flexible means between the fastener elements.

GIDEON SUNDBACK.